United States Patent [19]
Toomarian et al.

[11] Patent Number: 5,930,781
[45] Date of Patent: Jul. 27, 1999

[54] NEURAL NETWORK TRAINING BY INTEGRATION OF ADJOINT SYSTEMS OF EQUATIONS FORWARD IN TIME

[75] Inventors: Nikzad Toomarian, Encino; Jacob Barhen, La Crescenta, both of Calif.

[73] Assignee: The United States of America as represented by the Administrator of the National Aeronautics and Space Administration, Washington, D.C.

[21] Appl. No.: 07/969,868

[22] Filed: Oct. 27, 1992

[51] Int. Cl.$^6$ .................................................. G06F 15/18
[52] U.S. Cl. .................................................. 706/25; 706/16
[58] Field of Search .................................. 395/23, 24, 25, 395/22, 27, 50; 706/15–19, 20–23, 25

[56] References Cited

U.S. PATENT DOCUMENTS

| | | | |
|---|---|---|---|
| 4,804,250 | 2/1989 | Johnson | 349/17 |
| 4,912,652 | 3/1990 | Wood | 706/25 |
| 4,918,618 | 4/1990 | Tomlinson | 706/25 |
| 4,926,064 | 5/1990 | Tapang | 706/26 |
| 4,951,239 | 8/1990 | Andes et al. | 364/807 |
| 4,953,099 | 8/1990 | Jourjine | 706/26 |
| 4,967,369 | 10/1990 | Jourjine | 706/25 |
| 4,990,838 | 2/1991 | Kawato et al. | 395/81 |
| 5,046,019 | 9/1991 | Basehore | 706/1 |
| 5,046,020 | 9/1991 | Filkin | 706/25 |
| 5,050,095 | 9/1991 | Samad | 706/25 |
| 5,052,043 | 9/1991 | Gaborski | 382/157 |
| 5,058,034 | 10/1991 | Murphy et al. | 706/25 |
| 5,075,868 | 12/1991 | Andes et al. | 706/25 |
| 5,086,479 | 2/1992 | Takenaga et al. | 382/157 |
| 5,093,899 | 3/1992 | Hiraiwa | 706/25 |
| 5,105,468 | 4/1992 | Guyon et al. | 395/22 |
| 5,276,770 | 1/1994 | Castelaz | 395/23 |
| 5,283,855 | 2/1994 | Motomura et al. | 395/23 |

*Primary Examiner*—Tariq R. Hafiz
*Attorney, Agent, or Firm*—John H. Kusmiss

[57] ABSTRACT

A method and apparatus for supervised neural learning of time dependent trajectories exploits the concepts of adjoint operators to enable computation of the gradient of an objective functional with respect to the various parameters of the network architecture in a highly efficient manner. Specifically, it combines the advantage of dramatic reductions in computational complexity inherent in adjoint methods with the ability to solve two adjoint systems of equations together forward in time. Not only is a large amount of computation and storage saved, but the handling of real-time applications becomes also possible. The invention has been applied it to two examples of representative complexity which have recently been analyzed in the open literature and demonstrated that a circular trajectory can be learned in approximately 200 iterations compared to the 12000 reported in the literature. A figure eight trajectory was achieved in under 500 iterations compared to 20000 previously required. The trajectories computed using our new method are much closer to the target trajectories than was reported in previous studies.

20 Claims, 4 Drawing Sheets

Microfiche Appendix Included
(1 Microfiche, 26 Pages)

NEURAL NETWORK TRAINING BY INTEGRATION OF ADJOINT SYSTEMS OF EQUATIONS FORWARD IN TIME

BACKGROUND OF THE INVENTION

Origin of the Invention

The invention described herein was made in the performance of work under a NASA contract, and is subject to the provisions of Public Law 96517 (35 USC 202) in which the contractor has elected not to retain title.

Microfiche Appendix

A computer program (microfiche, 26 pages) embodying the invention is listed in the microfiche appendix filed with this specification. The microfiche appendix contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Technical Field

The invention relates to methods for training neural networks and in particular to neural network training methods using adjoint systems of equations corresponding to the forward sensitivity equations of the neural network.

Background Art

The following publications represent the state of the art in neural network training techniques, and are referred to in the specification below by author name and year:

Barhen, J., Toomarian, N. and Gulati, S. (1900a) "Adjoint operator algorithms for faster learning and dynamical neural networks". In David S. Touretzky (Ed.), Advances in Neural Information Processing Systems. Vol. 2, 498–508, San Mateo, Calif.: Morgan Kaufmann.

Barhen, J., Toomarian, N. and Gulati, S. (1990b). "Application of adjoint operators to neural learning". *Applied Mathematical Letters*, 3 (3), 13–18.

Cacuci, D. G. (1981). "Sensitivity theory for nonlinear systems". *Journal Math. Phys.*, 22 (12), 2794–2802.

Grossberg, S. (1987). The Adaptive brain. Vol. 2, North-Holland.

Hirsch, M. W. (1989) "Convergent activation dynamics in continuous time networks". *Neural Networks*, 2 (5), 331–349.

Maudlin, P. J., Parks, C. V. and Weber C. F. (1980). "Thermal-hydraulic differential sensitivity theory". American Society of Mechanical Engineering paper WA/HT-56.

Narendra, K. S. and Parthasarathy, K. (1990). "Identification and control of dynamical systems using neural networks". *IEEE transaction on Neural Networks*, 1 (1), 4–27.

Oblow, E. M. (1978). "Sensitivity theory for reactor thermal-hydraulic problems". *Nuclear Science and Engineering*, 68, 322–357.

Parlos, A. G., et. al. (1991). "Dynamic learning in recurrent neural networks for nonlinear system identification", preprint Pearlmutter, B. A. (1989). "Learning state space trajectories in recurrent neural networks". *Neural Computation*, 1 (2), 263–269.

Pearlmutter, B. A. (1990). "Dynamic recurrent neural networks". Technical Report CMU-CS-90-196, School of Computer Science, Carnegie Mellon University, Pittsburgh, Pa. Pineada, F. (1990). "Time dependent adaptive neural networks".In David S. Touretzky (Ed.), Advances in Neural Information Processing Systems. Vol. 2, 710–718, San Mateo, Calif.: Morgan Kaufmann.

Rumelhart, D. E., Hinton, G. E. and Williams, R. J. (1986). "Learning internal representations by error propagation". In D. E. Rumelhart, J. L. McCleland and the PDP Research Group, Parallel Distributed Processing: Exploration in the Microstructure of Cognition, Vol. 1, Foundations, Cambridge: MIT Press/Bradford Books.

Sato, M. (1990). "A real time learning algorithm for recurrent analog neural networks". *Biological Cybernetics*, 62 (3), 237–242.

Toomarian, N., Wacholder, E., and Kaizerman, S. (1987). "Sensitivity analysis of two-phase flow problems". *Nuclear Science and Engineering*, 99 (1), 53–81. Toomarian, N. and Barhen, J. (1991). "Adjoint operators and non-adiabatic algorithms in neural networks". *Applied Mathematical Letters*, 4 (2), 69–73.

Werbos, P. J. (1990). "Backpropagation through time: what it does and how to do it", *Proceeding of the IEEE*, 87 (10).

Williams, R. J., and Zipser, D. (1988). "A learning algorithm for continually running fully recurrent neural networks". Technical Report ICS Report 8805, UCSD, La Jolla, Calif. 92093.

Williams, R. J., and Zipser, D. (1989). "A learning algorithm for continually running fully recurrent neural networks", *Neural Computation*, 1 (2), 270–280.

Zak, M. (1989). "Terminal attractors in neural networks". *Neural Networks*, 2 (4), 259–274.

1. INTRODUCTION

Recently, there has been a tremendous interest in developing learning algorithms capable of modeling time-dependent phenomena (Grossberg, 1987; Hirsh, 1989). In particular, considerable attention has been devoted to capturing the dynamics embedded in observed temporal sequences (e.g., Narendra, 1990; Parlos et al., 1991).

In general, the neural architectures under consideration may be classified into two categories:

Feedforward networks, in which back propagation through time (Werbos, 1990) can be implemented. This architecture has been extensively analyzed, and is widely used in simple applications due, in particular, to the straightforward nature of its formalism.

Recurrent networks, also referred to as feedback or fully connected networks, which are currently receiving increased attention. A key advantage of recurrent networks lies in their ability to use information about past events for current computations. Thus, they can provide time-dependent outputs for both time-dependent as well as time-independent inputs.

One may argue that, for many real world applications, the feedforward networks suffice. Furthermore, recurrent network can, in principle, be unfolded into a multilayer feedforward network (Rumelhart et al. 1986). A detailed analysis of the merits and demerits of these two architectures is beyond the scope of this paper. Here, we will focus only on recurrent networks.

The problem of temporal learning can typically be formulated as a minimization, over an arbitrary but finite time interval, of an appropriate error functional. The gradients of the functional with respect to the various parameters of the neural architecture, e.g., synaptic weights, neural gains, etc. are essential elements of the minimization process and, in the past, major efforts have been devoted to the efficacy of their computation. Calculating the gradients of a system's output with respect to different parameters of the system is, in general, of relevance to several disciplines. Hence, a variety of methods have been proposed in the literature for computing such gradients. A recent survey of techniques which have been considered specifically for temporal learning can be found in Pearlmutter (1990). We will briefly mention only those which are relevant to our work.

Sato (1990) proposed, at the conceptual level, an algorithm based upon Lagrange multipliers. However, his algorithm has not yet been validated by numerical simulations, nor has its computational complexity been analyzed. Williams and Zipser (1989) presented a scheme in which the gradients of an error functional with respect to network parameters are calculated by direct differentiation of the neural activation dynamics. This approach is computationally very expensive and scales poorly to large systems. The inherent advantage of the scheme is the small storage capacity required, which scales as $O(N^3)$, where N denotes the size of the network.

Pearlmutter (1989), on the other hand, described a variational method which yields a set of linear ordinary differential equations for backpropagating the error through the system. These equations, however, need to be solved backwards in time, and require temporal storage of variables from the network activation dynamics, thereby reducing the attractiveness of the algorithm. Recently, Toomarian and Barhen (1991) suggested a framework which, in contradistinction to Pearlmutter's formalism, enables the error propagation system of equations to be solved forward in time, concomitantly with the neural activation dynamics. A drawback of this novel approach came from the fact that their equations had to be analyzed in terms of distributions, which precluded straightforward numerical implementation. Finally, Pineda (1990) proposed combining the existence of disparate time scales with a heuristic gradient computation. The underlying adiabatic assumptions and highly approximate gradient evaluation technique, however, placed severe limits on the applicability of his method.

SUMMARY OF THE INVENTION

The invention trains a neural network using a method for calculating the gradients of an error functional with respect to the system's parameters, which builds upon advances in nonlinear sensitivity theory (Oblow 1978, Cacuci 1981). In particular, it exploits the concept of adjoint operators to reduce the computational costs. Two novel systems of equations for error propagation (i.e., the adjoint equations), are at the heart of the computational framework. These equations are solved simultaneously (i.e., forward in time) with the network dynamics. The computational complexity of the algorithm scales as $O(N^3)$ per time step, the storage requirements are minimal i.e., of the order of $O(N^2)$, while complication arising from the presence of distributions in our earlier framwork are avoided. In the remainder of this specification, the terms sensitivity and gradient will be used interchangeably.

The method of the invention trains a neural network so that a neuron output state vector thereof obeys a set of forward sensitivity equations over a finite repeatable learning period, the method including setting the neuron output state vector to zero at the beginning of the learning period, defining first and auxiliary adjoint systems of equations governing an adjoint function and an auxiliary adjoint function, respectively, of the neural network and corresponding to the forward sensitivity equations, setting the adjoint function to zero at the beginning of the learning period and integrating the adjoint system of equations forward in time over the learning period to produce a first term of an indirect effect of a sensitivity gradient of the neural network, setting the auxiliary adjoint function to zero at the end of the learning period and integrating the auxiliary adjoint system of equations forward in time over the learning period to produce a remaining term of the indirect effect, computing a sum of the first and remaining terms, multiplying the sum by a learning rate and subtracting the product thereof from a current neuron parameter vector to produce an updated neuron parameter vector.

FIG.'s 7, 8 and 9 illustrate different simulation results of a neural network learning a figure-eight motion using the invention.

Figure 10:
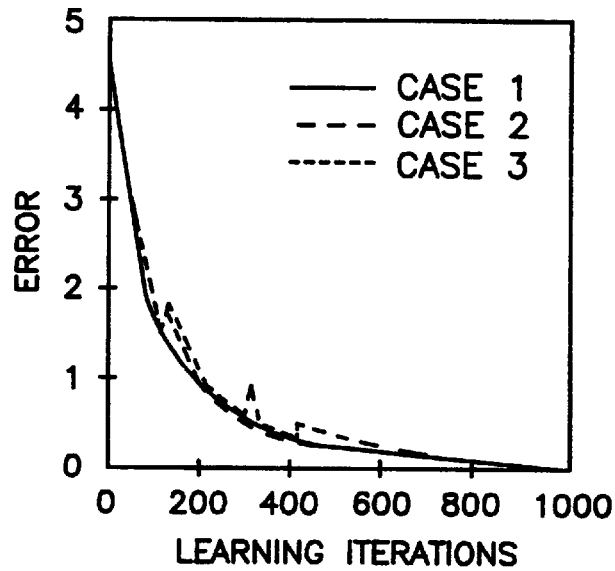

FIG. 10 is a graph of the error as a function of the number of learning iterations for each of the cases illustrated in FIG.'s 7–9.

DETAILED DESCRIPTION OF THE INVENTION

2. TEMPORAL LEARNING FRAMEWORK

Figure 1:
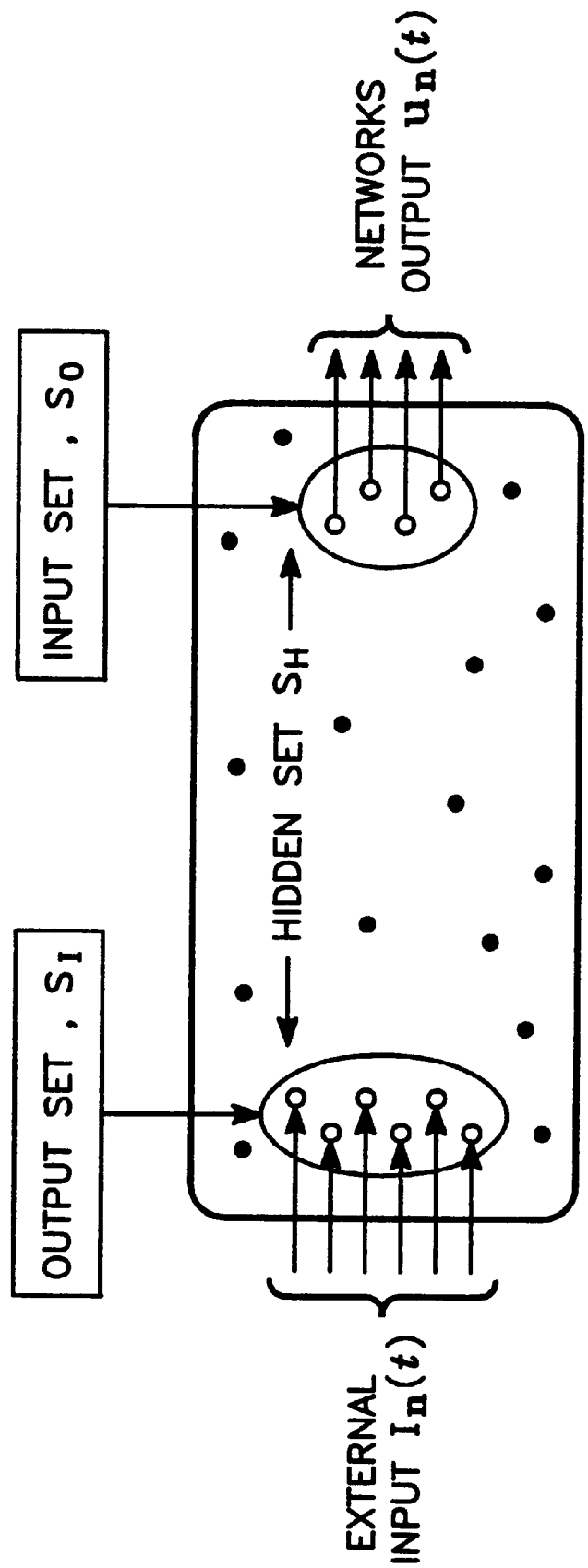
FIG. 1 is a diagram of a recurrent neural network employed in carring out the invention.

We formalize a neural network as an adaptive dynamical system whose temporal evolution is governed by the following set of coupled nonlinear differential equations:

$$\dot{u}_n + \kappa_n u_n = g_n\left[\gamma_n\left(\sum_m T_{nm} u_m + I_n\right)\right] \quad t > 0 \tag{1}$$

where $u_n$ represents the output of the nth neuron ($u_n(0)$ being the initial state), and $T_{nm}$ denotes the strength of the synaptic coupling from the m-th to the n-th neuron. The constants $k_n$ characterize the decay of neuron activities. The sigmoidal functions $g_n(.)$ modulate the neural responses, with gain given by $\gamma_n$; typically, $g_n(\gamma_n \chi) = \tan h(\gamma_n \chi)$. In order to implement a nonlinear functional mapping from an $N_I$-dimensional input space to an $N_O$-dimensional output space, the neural network is topographically partitioned into three mutually exclusive regions. As shown in FIG. 1, the partition refers to a set of input neurons $S_I$, a set of output neurons $S_O$, and a set of "hidden" neurons $S_H$. Note that this architecture is not formulated in terms of "layers", and that each neuron may be connected to all others including itself.

Let $\bar{a}(t)$ (in the sequel the overhead bar will denote a vector) be an N-dimensional vector of target temporal patterns, with non zero elements, $a_n(t)$, in the input and output sets only. When trajectories, rather than mappings, are considered, as we shall see in the sequel, components in the input set may also vanish. Hence, the time-dependent external input term in Eq. (1), i.e., $I_n(t)$, encodes component-contribution of the target temporal pattern via the expression $$I_n(t) = \begin{cases} a_n(t) & \text{if } n \in S_I \\ 0 & \text{if } n \in S_H \cup S_O \end{cases} \tag{2}$$

To proceed formally with the development of a temporal learning algorithm, we consider an approach based upon the minimization of an error functional, E, defined over the learning period or time interval $[t_o, t_f]$ by the following expression $$E(\bar{u}, \bar{p}) = \int_{t_o}^{t_f} \frac{1}{2} \sum_n e_n^2 \, dt = \int_{t_o}^{t_f} F \, dt \qquad (3)$$

where the error component, $e_n(t)$, represents the difference between the desired and actual value of the output neurons, i.e., $$e_n(t) = \begin{cases} a_n(t) - u_n(t) & \text{if } n \in S_O \\ 0 & \text{if } n \in S_I \cup S_H \end{cases} \qquad (4)$$

In our model, the internal dynamical parameters of interest are the strengths of the synaptic interconnections, $T_{nm}$, the characteristic decay constants, $k_n$, and the gain parameters, $\gamma_n$. They can be represented as a neuron parameter vector of M [M=$N^2$+2N] components $$\bar{p} = \{T_{11}, \ldots, T_{NN}, k_1, \ldots, k_N, \ldots, \gamma_N\} \qquad (5)$$

We will assume that elements of $\bar{p}$ are statistically independent. Furthermore, we will also assume that, for a specific choice of parameters and set of initial conditions, a unique solution of Eq. (1) exists. Hence, the state variables $\bar{u}$ (which may be referred to as the neuron output state vector) are an implicit function of the parameters $\bar{p}$. In the rest of this paper, we will denote the $\mu$th element of the vector $\bar{p}$ by $p_\mu$ (where the neuron parameter index $\mu=1, \ldots, M$).

Traditionally, learning algorithms are constructed by invoking Lyapunov stability arguments, i.e., by requiring that the error functional be monotonically decreasing during learning time, $\tau$. This translates into $$\frac{dE}{d\tau} = \sum_{\mu=1}^{M} \frac{dE}{dp_\mu} \cdot \frac{dp_\mu}{d\tau} < 0 \qquad (6)$$

One can always choose, with a learning rate $\eta > 0$ $$\frac{dp_\mu}{d\tau} = -\eta \frac{dE}{dp_\mu} \qquad (7)$$

which implements learning in terms of an inherently local minimization procedure. Attention should be paid to the fact that Eqs. (1) and (7) may operate on different time scales (i.e., the neural network behavior time t of Equation 1 and the neural adaptation or learning time $\tau$ of Equations 6 and 7), with parameter adaptation occurring at a slower pace. Integrating the dynamical system, Eq. (7), over the interval $[\tau, \tau+\Delta\tau]$, one obtains, $$p_\mu(\tau + \Delta\tau) = p_\mu(\tau) - \eta \int_\tau^{\tau+\Delta\tau} \frac{dE}{dp_\mu} d\tau \qquad (8)$$

Equation (8) implies that, in order to update a system parameter $p_\mu$, one must evaluate the "sensitivity" (i.e., the gradient) of E, Eq. (3), with respect to $p_\mu$ in the interval $[\tau, \tau+\Delta\tau]$. Furthermore, using Eq. (3) and observing that the time integral and derivative with respect to $p_\mu$ commute, one can write $$\frac{dE}{dp_\mu} = \int_{t_o}^{t_f} \frac{dF}{dp_\mu} dt = \int_{t_o}^{t_f} \frac{\partial F}{\partial p_\mu} dt + \int_{t_o}^{t_f} \frac{\partial F}{\partial \bar{u}} \cdot \frac{\partial \bar{u}}{\partial p_\mu} dt \qquad (9)$$

This sensitivity expression has two parts. The first term in the Right Hand Side (RHS) of Eq. (9) is called the "direct effect", and corresponds to the explicit dependence of the error functional on the system parameters. The second term in the RHS of Eq. (9) is referred to as the "indirect effect", and corresponds to the implicit relationship between the error functional and the system parameters via $\bar{u}$. In our learning formalism, the error functional, as defined by Eq. (3), does not depend explicitly on the system parameters; therefore, the "direct effect" vanishes, i.e., $$\frac{\partial F}{\partial p_\mu} = 0 \qquad (10a)$$

Since F is shown analytically (viz. Eqs. (3) and (4)), computation of $\partial F/\partial \bar{u}$ is straightforward. Indeed $$\frac{\partial F}{\partial u_n} = -e_n \qquad (10b)$$

Thus, to enable evaluation of the error gradient using Eq. (9), the "indirect effect" matrix $\partial \bar{u}/\partial \bar{p}$ should, in principle, be computed. In the sequel, we shall see that this is rather expensive from an algorithmic (i.e., computational complexity) perspective, but that an attractive alternative, based on the concept of adjoint operators, exists. First, however, we introduce the notion of teacher forcing.

3. TEACHER FORCING

A novel neural network "teacher forcing" training method is described in co-pending patent application Ser. No. 07/908,677 filed Jun. 29, 1992 by the inventors herein and entitled "Fast Temporal Neural Learning Using Teacher Forcing". As indicated in FIG. 2C of the above-referenced co-pending application, the parameters of the network are updated based upon the error accumulated over the length of the trajectory or learning period. This method is employed in numerical simulations of the present invention described in detail below. The present invention may be combined with such teacher forcing if desired, or the present invention may be practised without teacher forcing. In order to incorporate this teacher forcing into the neural learning formalism presented earlier, the time-dependent input to the neural activation dynamics, Eq. (1), i.e., $I_n(t)$ as given by Eq. (2), is modified to read:

$$I_n(t) = \begin{cases} a_n(t) & \text{if } n \in S_I \\ 0 & \text{if } n \in S_H \\ \lambda[a_n(t)]^{1-\beta}[a_n(t) - u_n(t)]^\beta & \text{if } n \in S_O \end{cases} \qquad (11)$$

At this state, $\lambda$ and $\beta$ are assumed to be positive constants. The purpose of the term $[\alpha_n(t)]^{1-\beta}$ is to insure that $I_n(t)$ has the same dimension as $\alpha_n(t)$ and $u_n(t)$. Zak (1989) has demonstrated that in general, for $\beta=(2i+1)/(2j+1)$, i<j and i and j strictly positive integers, an expression of the form $[\alpha_n - u_n]^\beta$ induces a terminal attractor phenomenon for the dynamics described in Eq. (1). Generally, $\beta=7/9$ for the numerical simulations reported below in this specification.

When learning is successfully completed, [i.e., $e_n(t)=0$] teacher forcing will vanish, and the network will revert to the conventional dynamics given by Eqs. (1) and (2). As described in the above-referenced co-pending application, we suggest that $\lambda$ be modulated in time as a function of the error functional, according to $$\lambda(\tau) = 1 - e^{-E(\tau)} \qquad (12)$$

The above expression should be understood as indicating that, while $\lambda$ varies on the learning time scale, it remains at essentially constant levels during the iterative passes over the interval $[t_o, t_f]$.

4. GRADIENT COMPUTATION ALGORITHMS

The efficient computation of system response sensitivities (e.g., error functional gradients) with respect to all parameters of a network's architecture plays a critically important role in neural learning. In this section, we will first review two of the best currently available methods for computing these sensitivities, including an explicit approach for calculating the matrix $\partial \bar{u}/\partial \bar{p}$, and an alternative approach, based upon the concept of adjoint operators, which involves error back propagation through time. This will be followed by the details of a new method, which enables an efficient computation of the sensitivities by solving two systems of adjoint equations forward in time.

4.1 State-of-the-art Methods
4.1.1 DIRECT APPROACH

Let us differentiate the activation dynamics, Eq. (1), including the teacher forcing, Eq. (11), with respect to $p_\mu$. We observe that the time derivative and partial derivative with respect to $p_\mu$ commute. Using the shorthand notation $\partial( \ldots )/\partial p_\mu = ( \ldots )_{,82}$ we obtain a set of equations to be referred to in the sequel as "Forward Sensitivity Equations" (FSEs):

$$\begin{cases} \dot{u}_{n,\mu} + \sum_m A_{nm} u_{m,\mu} = S_{n,\mu} & t > 0 \\ u_{n,\mu} = 0 & t = 0 \end{cases} \qquad (13)$$

in which $$A_{nm} = (\kappa_n - \gamma_n g'_n \partial I_n / \partial u_n) \delta_{nm} - \gamma_n g'_n T_{nm} \qquad (14)$$

$$S_{n,\mu} = -u_n \delta_{p_\mu, \kappa_n} + \gamma_n g'_n \sum_m u_m \delta_{p_\mu, T_{nm}} + g'_n \left( \sum_m T_{nm} u_m + I_n \right) \delta_{p_\mu, \gamma_n} \qquad (15)$$

In the above expressions, $g^1_n$ represents the derivative of $g_n$ with respect to its arguments, $\delta$ denotes the Kronecker symbol and $S_{n,\mu}$ is defined as a nonhomogeneous "source". The source term contains all explicit derivatives of the neural activation dynamics, Eq. (1), with respect to the system parameters, $p_\mu$. Hence, it is parameter dependent and its size is $(N\chi M)$. The initial conditions of the activation dynamics, Eq. (1), are excluded from the vector of system parameters $\bar{p}$. Thus, the initial conditions of the FSEs will be taken as zero. Their solution will provide the matrix $\partial \bar{u}/\partial \bar{p}$ needed for computing the "indirect effect" contribution to the sensitivity of the error functional, as specified by Eq. (9). This algorithm is, essentially, similar to the scheme proposed by Williams and Zipser (1989). Computation of the gradients using the forward sensitivity formalism would require solving Eq. (13) M times, since the source term, $S_{n,\mu}$, explicitly depends on $p_\mu$. This system has N equations, each of which requires multiplication and summation over N neurons. Hence, the computational complexity, measured in terms of multiply-accumulates, scales like $N^2$ per system parameter, per time step. Let us assume, furthermore, that the interval $[t_0, t_f]$ is discretized into L time steps. Then, the total number of multiply-accumulates scales like $N^4L$. Clearly, such a scheme exhibits expensive scaling properties, and would not be very practical for large networks. On the other hand, since the FSEs are solved forward in time, along with the neural dynamics, the method also has inherent advantages. In particular, there is no need for a large amount of memory. Since $u_{n,\mu}$ has $N^3+2N^2$ components, the storage requirement scales as $O(N^3)$.

4.1.2 INDIRECT APPROACH

In order to reduce the computational complexity associated with the above technique for evaluating the "indirect effect" term in Eq. (9), an alternative approach can be considered. It is based upon the concept of adjoint operators, and eliminates the need to compute explicitly $\bar{u}_{,\mu}$. The critical feature of this approach is that a single vector of adjoint functions, $\bar{v}$, is obtained, by solving an N-dimensional system of equations once, not M times as previously. This vector contains all the information required for computing the sensitivities of the error functional, $dE/dp_\mu$, with respect to all parameters, $p_\mu$. The necessary and sufficient conditions for constructing adjoint equations are discussed in Cacuci (1981). Adjoint equations can be derived in a number of manners, including variational, perturbation theoretic, differential and functional analytic techniques. Details of derivations, based upon the differential approach, for example, can be found in Toomarian (1987) and Maudlin et al. (1980).

It can be shown that an Adjoint System of Equations (ASEs) pertaining to the FSEs, Eq. (13), can be formally written as $$-\dot{v}_n + \sum_m A^T_{nm} v_m = S^*_n \qquad t > 0 \qquad (16)$$

where the superscript "T" denotes transposition of the ASE matrix $A_{nm}$, and the indices n and m range from 1 to N. In order to specify Eq. (16) in closed mathematical form, we must define the source term, $S^*_n$, and the initial conditions for the system. (An initial condition may apply to the beginning of the learning period or the end of the learning period.) Both should be independent of $\bar{u}_{,\mu}$ and its derivatives. As we will see in the sequel, a judicious choice of the source term, $S^*_n$, and of the initial conditions for the ASEs, Eq. (16), forms the cornerstone of the indirect methods. Generally, the source term, $S^*_n$, is selected in such a way, as to make its inner product with $\bar{u}_{,\mu}$ identical to the "indirect effect" contributions to the sensitivities of the error functional. Selection of the time (initial or final) at which the initial conditions are specified will, on the other hand, dictate the direction in time in which the ASEs should be integrated. For instance, if the set of initial condition is specified at $t_o$, the ASEs will be integrated forward in time. On the other hand, if the initial conditions are given at $t_f$, the ASEs must be integrated backward in time. In the remainder of section 4.1, we will derive and discuss the advantages and disadvantages of two algorithms, which integrate the ASEs backward and forward in time, respectively.

a—Integration of the ASEs backward in time

In order to construct an expression which can be used to eliminate the dependence of the "indirect effect" term of the sensitivities on $\bar{u}_{,\mu}$, we have to form the inner product of the vectors $\bar{S}^*$ and $\bar{u}_{,\mu}$. This is done by multiplying the FSEs, Eq. (13), by $\bar{v}^T$, and the ASEs, Eq. (16), by $\bar{u}_{,\mu}^T$, and by subtracting the two resulting equations. Then, integrating over the time interval $[t_o, t_f]$, yields the bilinear form:

$$[\bar{v}^T \bar{u}_{,\mu}]_{t_f} - [\bar{v}^T \bar{u}_{,\mu}]_{t_o} = \int_{t_o}^{t_f} (\bar{v}^T \bar{S}_{,\mu}) dt - \int_{t_o}^{t_f} (\bar{u}_{,\mu}^T \bar{S}^*) dt \qquad (17)$$

In the above equation $\bar{S}_{,\mu}$ denotes the inhomogeneous source term of the FSEs, Eq. (15), and $[\ldots]_t$ denotes the value of the expression in brackets evaluated at time t. By identifying $$S^*_n = \partial F / \partial u_n \qquad (18a)$$

the second integral in the RHS of Eq. (17) is seen to become identical to the "indirect effect" term in Eq. (9). Incorporating the initial conditions of Eq. (13) into Eq. (17), we obtain:

$$\int_{t_o}^{t_f} \left(\frac{\partial F}{\partial \bar{u}}\right)^T \bar{u}_{,\mu} dt = \int_{t_o}^{t_f} \bar{v}^T \bar{S}_{,\mu} dt - [\bar{v}^T \bar{u}_{,\mu}]_{t_f} \qquad (19)$$

How can we eliminate the undesirable presence of $\bar{u}_{,\mu}$ from the RHS of Eq. (19)? The clear choice is $$\bar{v}(t=t_f)=0 \qquad (18b)$$

resulting in the fundamental identity $$\int_{t_o}^{t_f} \left(\frac{\partial F}{\partial \bar{u}}\right)^T \bar{u}_{,\mu} dt = \int_{t_o}^{t_f} \bar{v}^T \bar{S}_{,\mu} dt \qquad (20)$$

Since the ASEs, (Eqs. 16, and 18), and $\bar{S}_{,\mu}$ (which is known by definition) are independent of $\bar{u}_{,\mu}$, the RHS of Eq. (20) is independent of $\bar{u}_{,\mu}$. Hence, by solving the ASEs once only, the "indirect effect" is evaluated via the RHS of Eq. (20) for all system parameters, $\bar{p}$. Thus, the above identity provides the basis for a computationally efficient algorithm for evaluating the gradient of the error functional. It is important to notice that since the initial conditions, Eq. (18b), for the ASEs, were given at trajectory end time, i.e., at $t=t_f$, Eq. (16), is integrated backward in time, i.e., from $t=t_f$ to $t=t_o$.

We note that the above paradigm results in equations similar to those obtained by Pearlmutter (1989) using a variational approach. Both algorithms require that th neural activation dynamics, Eq. (1), be first solved forward in time (to provide quantities such as $A_{nm}^T$, $$\frac{\partial F}{\partial \bar{u}},$$

$\bar{S}_{,\mu}$) followed by a solution of the ASEs, Eq. (16), integrated backward in time. During the backward integration, the product of the vector $\bar{v}$ and matrix $\bar{S}_{,\mu}$ is calculated and also integrated from $t=t_f$ to $t=t_o$. The result of this integration provides the "indirect effect" contribution to the gradients of the error functional.

Since $u_n(t)$ and $v_n(t)$ can be obtained at the cost of N multiply-accumulates per time step, and there are N equations (neurons) per network, the complexity of this approach scales like $N^2L$. Thus, the principal advantage of adjoint methods lies in the dramatic reduction of computational costs (e.g., at least $O(N^2)$ for an N-neuron network). However, a major drawback to date has come from the necessity to store quantities such as $\bar{g}^1$, $\bar{S}^*$ and $\bar{S}_{,\mu}$ at each time step. Hence, the memory requirements for this method scale as $N^2L$. Note also that the actual evaluation of the RHS of Eq. (9) requires $N^2L$ multiply-accumulates, independent whether the FSEs or ASEs are used.

b—Integration of the ASEs forward in time

Is it possible to overcome the rather severe memory limitations of the adjoint method, while keeping its computational benefits? We notice that Eq. (16) is linear in the variables $\bar{v}$. Therefore, it is, in principle, possible to obtain identical contributions to Eq. (9) with an alternative choice for adjoint source and initial conditions. Indeed, let us select:

$$\bar{S}^* = \frac{\partial F}{\partial \bar{u}} - \bar{v}\delta(t - t_f) \qquad (21a)$$

and $$\bar{v}(t=0) = 0 \qquad (21b)$$

where $\delta(t-t_f)$ is the Dirac distribution. Inserting Eqs. (21) into Eq. (17) and recalling that, by definition of $\delta$ $$\int_{t_o}^{t_f} \bar{u}_{,\mu}^T \bar{v}\delta(t-t_f) dt = [\bar{v}^T \bar{u}_{,\mu}]_{t=t_f} \qquad (22)$$

we obtain $$\int_{t_o}^{t_f} \left(\frac{\partial F}{\partial \bar{u}}\right)^T \bar{u}_{,\mu} dt = \int_{t_o}^{t_f} \bar{v}^T \bar{S}_{,\mu} dt \qquad (23)$$

This expression is identical to Eq. (20). Therefore, most items discussed in connection with this equation will hold. However, $\bar{v}$ is now the solution of the ASEs defined by Eqs. (16) and (21). In contradistinction to the previous approach, the initial conditions for the ASEs are given hereat $t=t_o$, Eq. (21b). Therefore, the ASEs can be integrated forward in time, concomitantly with the neural activation dynamics. Potentially, storage requirements are reduced by a large amount, since the quantities $\bar{S}^*$ and $\bar{g}^1$ are now immediately used at each time step to calculate $\bar{v}$ and its product with the known matrix $\bar{S}_{,\mu}$. Hence, the memory required scales only as $O(N^2)$. The computational complexity of this method also scales as $O(N^2L)$. A potential drawback, however, lies in the fact that Eq. (16) now contains, from Eq. (21a), the Dirac distribution, $\delta(t-t_f)$, operating directly on the adjoint functions, $\bar{v}$. This precludes straightforward (stable) numerical or VLSI implementation of such a scheme.

4.2 The New Approach

At this stage, we introduce a new paradigm which will enable us to evolve the adjoint dynamics, Eq. (16) forward in time, but without the difficulties associated with the above formalism. Consider, again, the bilinear form, Eq. (17), associated with the FSEs, Eq. (13), and the ASEs, Eq. (16). Let us select $$\bar{S}^* = \frac{\partial F}{\partial \bar{u}} \qquad (24a)$$

This is similar to the choice made earlier, when discussing the integration of the ASEs backward in time. The second integral in the RHS of Eq. (17) will again be identical to the "indirect effect" contribution to the sensitivity of the error functional, Eq. (9). But, in contradistinction to Eq. (18b), we now select as initial conditions:

$$\bar{v}(t=0)=0 \qquad (24b)$$

This will allow us to integrate the resulting ASEs, i.e., Eqs. (16) and (24), forward in time. Combining Eqs. (9), (17) and (24), we obtain the following expression:

$$\int_{t_o}^{t_f} \left(\frac{\partial F}{\partial \bar{u}}\right)^T \bar{u}_{,\mu} dt \equiv \int_{t_o}^{t_f} (\bar{S}^*)^T \bar{u}_{,\mu} dt = \int_{t_o}^{t_f} (\bar{v})^T \bar{S}_{,\mu} \, dt - [\bar{v}^T \bar{u}_{,\mu}]_{t_f} \quad (25)$$

The first term in the RHS of Eq. (25) can be computed by using the values of $\bar{v}$ resulting from the solution of Eqs. (16) and (24) forward in time. The main difficulty resides with the evaluation of the second term in the RHS of Eq. (25), i.e., $[\bar{v}^T \bar{u}_{,\mu}]_{t_f}$. To compute it, we now introduce an auxiliary adjoint system, formally similar to Eq. (16):

$$-\dot{\bar{z}}_n + \sum_m A_{nm}^T \bar{z}_m = \hat{S}_n \quad t > 0 \quad (26)$$

Once again, the inner product of $\bar{u}_{,\mu}$ and $\hat{S}$ is required. The bilinear form associated with $\bar{u}_{,\mu}$ and $\bar{z}$ is obtained in a similar fashion to the derivation of Eq. (17). Its expression is:

$$[\bar{z}^T \bar{u}_{,\mu}]_{t_f} - [\bar{z}^T \bar{u}_{,\mu}]_{t_o} = \int_{t_o}^{t_f} (\bar{z}^T \bar{S}_{,\mu}) dt - \int_{t_o}^{t_f} \left(\bar{u}_{,\mu}^T \hat{\bar{S}}\right) dt \quad (27)$$

By choosing $$\hat{S} = \bar{v}(t) \delta(t - t_f) \quad (28a)$$

the last term of Eq. (27) reduced to $[\bar{v} \bar{u}_{,\mu}]_{t_f}$, which is the quantity of interest. If we furthermore select $$\bar{z}(t_f) = 0 \quad (28b)$$

and take into account the initial value of $\bar{u}_{,\mu}$, Eq. (27) yields $$\int_{t_o}^{t_f} \left(\bar{u}_{,\mu}^T \hat{\bar{S}}\right) dt = [\bar{v}^T \bar{u}_{,\mu}]_{t_f} = \int_{t_o}^{t_f} (\bar{z}^T \bar{S}_{,\mu}) dt \quad (29)$$

Note that, even though we selected $\bar{z}(t_f)=0$, we are still interested in solving the auxiliary adjoint system, Eqs. (26) and (28), forward in time. Thus, the critical issue is how to select initial condition (i.e., $\bar{z}(t_o)$), that would result in $\bar{z}(t_f)=0$.

Let us first provide a simple qualitative illustration of how this problem can be approached. We assume, for the moment, that the matrix A in Eq. (26) is time independent. The formal solution of Eqs. (26) and (28) can then be written as:

$$\bar{z}(t) = e^{A^T(t-t_o)} \bar{z}(t_o) \quad t < t_f \quad (30a)$$

$$\bar{z}(t_f) = e^{A^T(t_f - t_o)} \bar{z}(t_o) = \bar{v}(t_f) \quad (30b)$$

In principle, using Eq. (30a), the RHS of Eq. (29) can be expressed in terms of $\bar{z}(t_o)$. At time $t_f$, where $\bar{v}(t_f)$ is known from the solution of Eqs. (16) and (24), one can calculate the vector $\bar{z}(t_o)$, from Eq. (30b), with $\bar{z}(t_f)=0$.

In the problem under consideration, however, the ASE matrix A in Eq. (26) is time dependent, (viz Eq. (14)). Thus, it is practical to integrate numerically the auxiliary adjoint equations. Usually, the same numerical scheme used for Eqs. (1) and (16) should be adopted. For illustrative purposes only, we limit the discussion in the sequel to a first order finite differences approximation, i.e., we rewrite Eqs. (26, 28) as $$-\frac{(\bar{z}^{l+1} - \bar{z}^l)}{\Delta t} + [A^T]^l \bar{z}^l = 0 \quad 0 \le l < L \quad (31)$$

where, superscript l implies that the numerical values of the quantities of interest at time step l are used and $\Delta t$ denotes the size of the integration time step. Here, $[A^T]^l$ denotes the ASE matrix evaluated at the time step l. From the above equation one can easily show that $$\bar{z}^{l+1} = B^l \cdot B^{l-1} \ldots B^1 B^0 \bar{z}(t_o) \equiv B^{l!} \bar{z}(t_o) \quad (32)$$

where $$B^l = I + \Delta t [A^T]^l \, (l=0,1,\ldots,L-1) \quad (33)$$

and I denotes the identity matrix. The term $B^l$ may be referred to as a propagation kernel. Using a numerical approximation for the integral, the RHS of Eq. (29) can be recast as $$[\bar{v}^T \bar{u}_{,\mu}]_{t_f} = \bar{z}^T(t_o) \left[ \sum_l [B^T]^{(l-1)!} \bar{S}_{,\mu}^l \right] \Delta t \quad (34)$$

Algorithmically, the computation of $[\bar{v}^T \bar{u}_{,\mu}]_{t_f}$ can be described as follows. At each time step l, the values of the matrices $B^{(l-1)}$, and $\bar{S}_{,\mu}^l$, are calculated using Eqs. (14, 15 and 33). The needed value of $B^{(l-1)!}$ is computed by multiplying the stored value of $B^{(l-2)!}$ by $B^{(l-1)}$. The result is not only stored for the next iteration, but also used to calculate the product of $B^{(l-1)!}$ by $\bar{S}_{,\mu}^l$ which, in turn, is added up. The initial conditions $\bar{z}(t_o)$ can easily be found at time $t_f$, i.e., at iteration step L, by solving the system of linear algebraic equations:

$$B^{(L-1)!} \bar{z}(t_o) = \bar{v}(t_f) \quad (35)$$

To summarize, in this new method the computation of the gradients of the error functional (i.e., Eq. (9)), involves two stages, corresponding to the two terms in the RHS of Eq. (25). The first term is calculated from the adjoint functions, $\bar{v}$, obtained by integrating Eqs. (16) and (24) forward in time along with the neural activation dynamics, Eq. (1). The corresponding computational complexity is $O(N^2 L)$. The second term is calculated via Eqs. (34–35), and involves two steps: a) kernel propagation, Eq. (34), which requires multiplication of two matrices $B^l$ and $B^{(l-1)!}$ at each time step; hence, its computational complexity scales as $N^3 L$; b) solution of the linear algebraic system (35) with computational complexity of $O(N^2)$. Thus, the overall computational complexity of this approach is $O(N^3 L)$. Notice, however, that here the storage needed is minimal and equal to $O(N^2)$.

Figure 2:
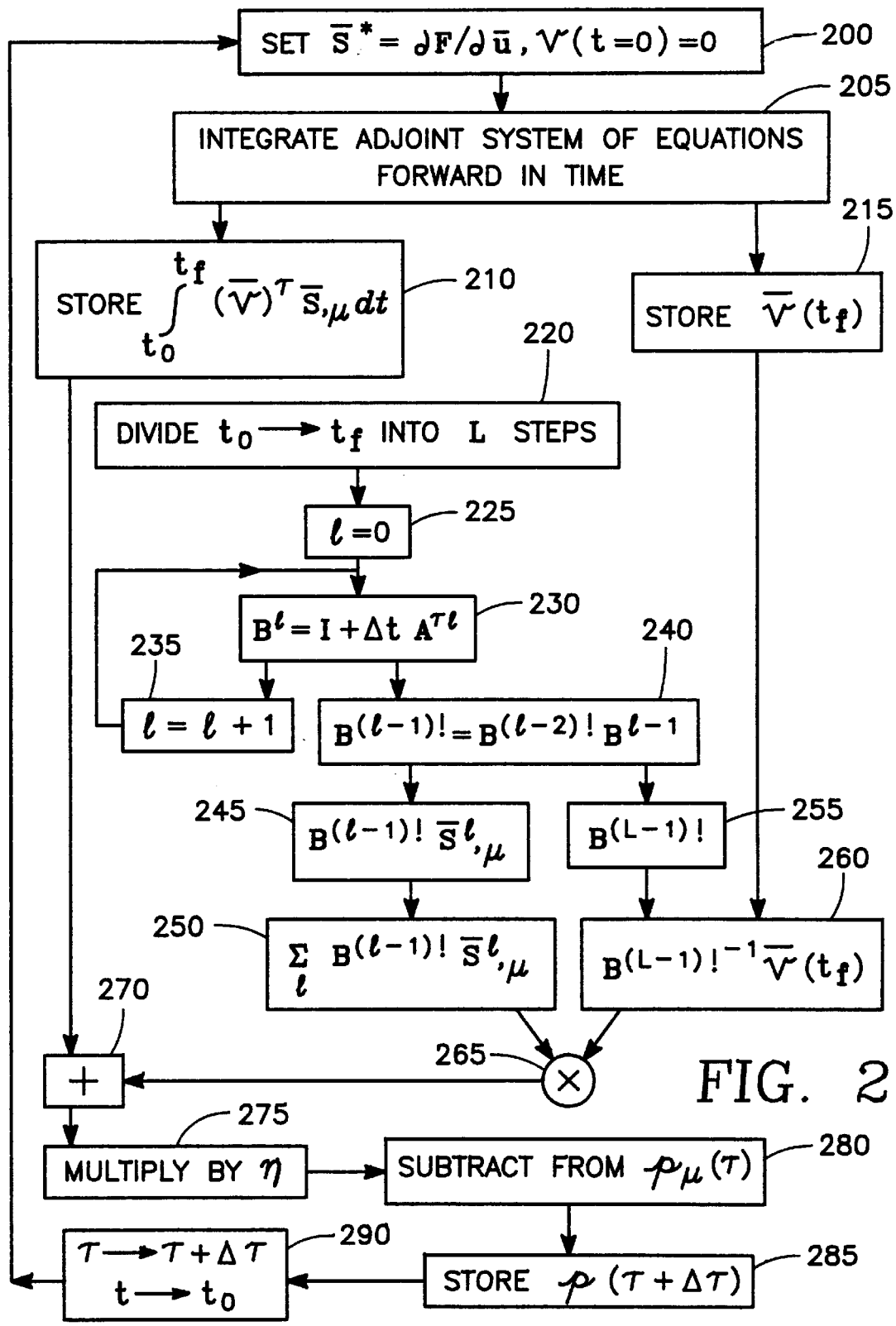
FIG. 2 is a block diagram illustrating architecture which performs the process embodying the present invention for training in neural network by integration of adjoint systems of equations forward in time.

An architecture for performing the foregoing process is illustrated in the block diagram of FIG. 2. Each block in FIG. 2 may be thought of as a separate dedicated processor, although the entire process is implementable with a single processor using the program of Appendix A. Referring to FIG. 2, the first step is to set the source term to the partial derivative of the error functional F with respect to the neuron output state vector and to set the adjoint function at the beginning of the learning period to zero (block 200). Then, the adjoint system of equations (Equation 16) is integrated forward in time (block 205) to produce the first of two components of the indirect effect of the sensitivity gradient of equation (9) (block 210 of FIG. 2) and the adjoint function evaluated at the end of the learning period (block 215). The next process includes blocks 220 through 265 of FIG. 2 and corresponds to an integration of the auxiliary adjoint system of equations (Equation 26) forward in time and is performed contemporaneously with the integration step of block 205. In block 220, the integration of the auxiliary ASE's over the learning period is divided into L time steps and the time step index l is set to zero (block 225). At each time step, the propagation kernel B is computed (block 230) and the time step index is incremented (block 235). The kernels are propagated at each time step by multiplying the current kernel by the product of the kernels of all previous time steps at block 240 and multipled by the derivative of the source term with respect to neuron parameters (block 245) and the result is summed over all time steps (block 250). The result of block 240 corresponding to the final time step is taken in block 250 for use in solving the system of Equation (35). This solution is indicated in FIG. 2 as a multiplication (block 260) of the inverse of the propagation kernel of block 255 by the adjoint function at the end of the learning period (of block 215). However, it is understood that well-known iterative methods may be employed in solving the system of Equation 35 rather than inversing the propagation kernel. Finally, the results of blocks 250 and 260 are multiplied together (block 265) to produce the remaining component of the indirect effect of the sensitivity gradient of Equation (19). This remaining component (i.e., the product of block 265) is added at block 270 to the first component of the indirect effect (from block 210), the resulting sum is multiplied by the learning rate (block 275) and subtracted from the current parameter vector (block 280) to produce an updated parameter vector (block 285). Then, the time t is reset and the learning time τ is incremented (block 290) and the entire process repeated.

As a final remark, we wish to consider a further approximation, based upon the requirement of small Δt. The matrices $B^l$, Eq. (33), become then diagonally dominant, and $B^{l_1}$ can be approximated at each time step l by $$B^{l_1} = I + \Delta t \sum_l A^l \quad (36)$$

This implies that the computation al complexity of the proposed method could be further reduced to $O(N^2L)$ for certain class of trajectories. At this stage such an approximation is merely an idea which has to be sustained via simulations.

5. Numerical Simulations

The new learning paradigm, presented in the preceding section, has been applied to the problem of learning two trajectories: a circle and a figure eight. Results referring to these problems can be found in the literature (Pearlmutter 1989), and they offer sufficient complexity for illustrating the computational efficiency of our proposed formalism.

The network that was trained to produce these trajectories involved 6 fully connected neurons, with no input, 4 hidden and 2 output units. An additional "bias" neuron was also included. In our simulations, the dynamical systems were integrated using a first order finite difference approximation. The sigmoidal nonlinearity was modeled by a hyperbolic tangent. Throughout, the decay constants $\kappa_n$, the neural gains $\gamma_n$, and λ were set to one. Furthermore, β was selected to be 7/9. For the learning dynamics, Δτ was set to 6.3 and η to 0.015873. The two output units were required to oscillate according to $$a_5(t) = A \sin wt \quad (36a)$$

$$a_6(t) = A \cos wt \quad (36b)$$

for the circular trajectory, and, according to $$a_5(t) = A \sin wt \quad (37a)$$

$$a_6(t) = A \sin 2 wt \quad (37b)$$

for the figure eight trajectory. Furthermore, we took A=0.5 and ω=1. Initial conditions were defined at $t_o$=0. Plotting $a_5$ versus $a_6$ produces the "desired" trajectory. Since the period of the above oscillations is 2π, $t_f$=2π time units are needed to cover one cycle. We selected Δt=0.1, to cover one cycle in approximately 63 time steps.

5.1 Circular Trajectory

In order to determine the capability and effectiveness of the algorithm, three cases were examined. As initial conditions, the values of $u_n$ were assumed to be uniform random numbers between −0.01 and 0.01 for the simulation studies referred in the sequel as "Case - 1" and "Case - 2". For Case - 3, we set $u_n$ equal to zero, except $u_6$ which was set to 0.5. The synaptic interconnections were initialized to uniform random values between −0.1 and +0.1 for all three experiments.

CASE - 1

Figure 3:
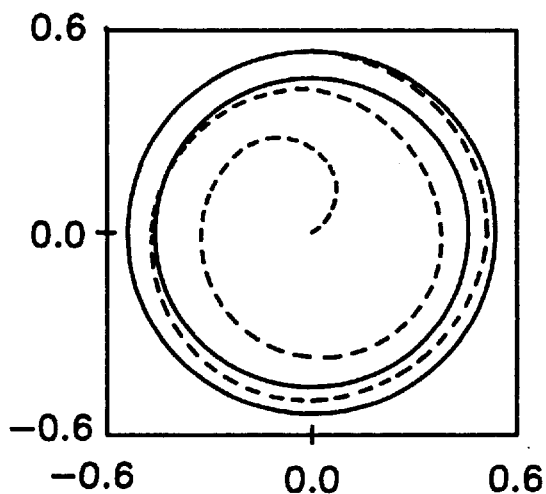
FIG. 3, 4 and 5 illustrate different simulation results of a neural network learning a circular motion using the invention.
Figure 6:
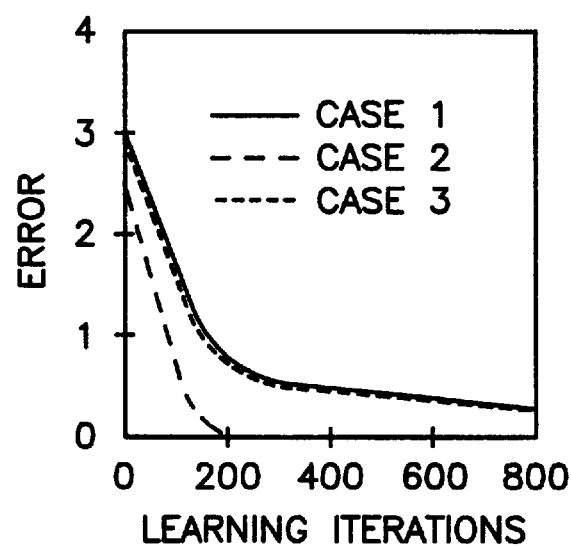
FIG. 6 is a graph of the error as a function of the number of learning iterations for each of the cases illustrated in FIG.'s 3–5.

The training was performed over $t_f$=6.5 time units (i.e., 65 time intervals). A maximum number of 500 iterations was allowed. The results shown in FIG. 3 were obtained by starting the network with the same initial conditions, $u_n$(0), as used for training, the learned values of the synaptic interconnections, $T_{nm}$, and with no teacher forcing (λ=0). As we can see, it takes about 2 cycles until the network reaches a consistent trajectory. Despite the fact that the system's output was plotted for more than 15 cycles, only the first 2 cycles can be distinguished. FIG. 6 demonstrates that most of the learning occurred during the first 300 interations.

CASE - 2

Figure 4:
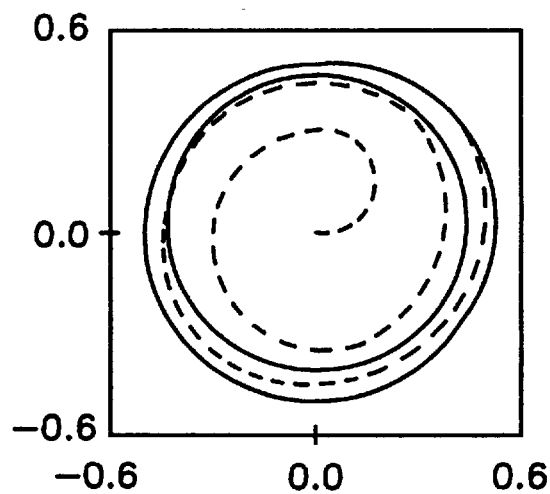

Here, we decided to increase the length of the trajectory gradually. A maximum number of 800 learning iterations was now allowed. The length of the training trajectory was 65 time intervals for the first 100 iterations, and increased every 100 iterations by 10 time intervals. Therefore, it was expected that the error functional would increase whenever the length of the trajectory was increased. This was indeed observed, as may be seen from the learning graph, shown in FIG. 6. The output of the trained network is illustrated in FIG. 4. Here again, from 15 recall cycles, only the first two (needed to reach the steady orbit) are distinguishable and the rest overlap. Training using greater trajectory lengths yielded a recall circle much closer to the desired one than in the previous case. From FIG. 6, one can see that the last 500 iterations did not enhance dramatically the performance of the network. Thus, for practical purposes, one may stop the training after the first 300 iterations.

CASE - 3

Figure 5:
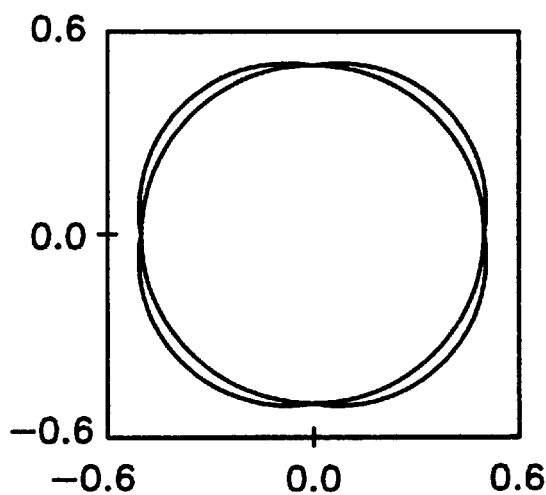

The selection of appropriate initial conditions for $u_n$ plays an important role in the effectiveness of the learning. Here, all initial values of $u_n$ were selected to be exactly zero except the last unit, where $u_6$=0.5 was chosen. This correspond to an initial point on the circle. The length of the trajectory was increased successively, as in the previous case. In spite of the fact that we allowed the system to perform up to 800 iterations, the learning was essentially completed in about 200 iterations, as shown in FIG. 6. The results of the network's recall are presented in FIG. 5, which shows an excellent match.

5.2 Figure Eight Trajectory

For this problem, the synaptic interconnections were initialized to uniform random values between −1 and 30 1. As initial conditions, the values of $u_n$ were assumed to be uniform random numbers between −0.01 and 0.01. The following three situations were examined.

CASE - 4

Figure 7:
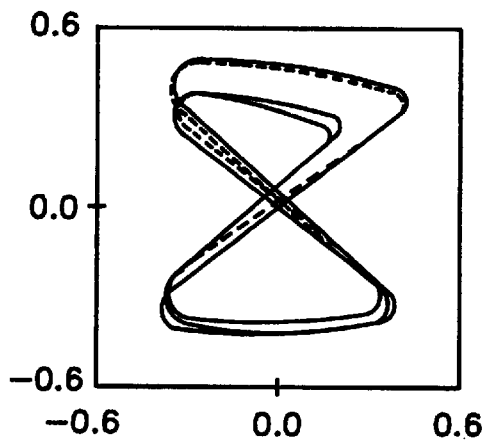

The training was performed over $t_f=6.5$ time units (i.e., 65 time intervals). A maximum number of 1000 iterations was allowed. The results shown in FIG. 7 were obtained by starting the network with the same initial conditions, $u_n(0)$, as used for training, the learned values of the synaptic interconnections, $T_{nm}$, and with no teacher forcing ($\lambda=0$). As we can see, it takes about 3 cycles until the network reaches a consistent trajectory. Despite the fact that the system's output was plotted for more than 15 cycles, only the first 3 cycles can be distinguished.

CASE - 5

Figure 8:
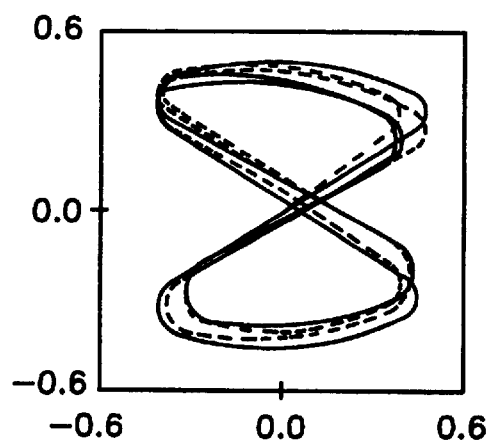

Here, we again decided to increase the length of the trajectory gradually. A maximum number of 1000 iterations was now allowed. The length of the training trajectory was 65 time intervals for the first 100 iterations, and was increased every 100 iterations by 5 time intervals. Therefore, it was again expected that the objective functional would increase whenever the length of the trajectory was increased. This was indeed observed, as may be seen from the learning graph, shown in FIG. 10. The output of the trained network is illustrated in FIG. 8. Here again, from 15 recall cycles, only the first three (needed to reach the steady orbit) are distinguishable, and the rest overlap. As a direct result of training using greater trajectory lengths, orbits much closer to the desired one than in the previous case were obtained.

CASE - 6

Figure 9:
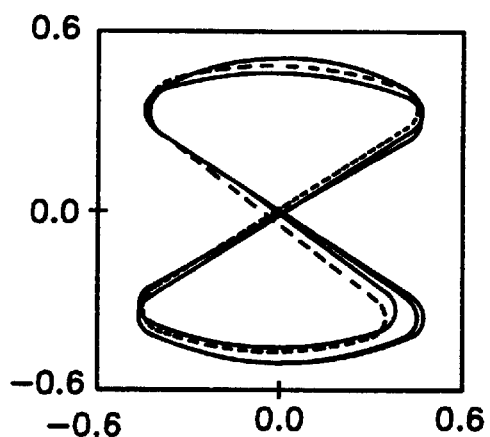

The learning in this case was performed under conditions similar to CASE - 5, but with the distinction that $\lambda$ was modulated according to Eq. (12). The results of the network's recall are presented in FIG. 9, and demonstrate a dramatic improvement with respect to the previous two cases.

It is important to keep in mind the following observations with regard to the simulation results:

1) For the circular trajectory, $\lambda$ was kept constant throughout the simulations and not modulated according to Eq. (12). As we can see from FIG. 6, in cases 1 and 2, the error functional was not reduced to zero. Hence, a discrepancy in the functional form of the neural activation dynamics used during the learning and recall stages occurred. This was a probable cause for the poor performance of the network. In case 3, however, the error functional was reduced to zero. Therefore, the teacher forcing effect vanished by the end of the learning.

2) For the figure eight trajectory, the differences between cases 5 and 6 lies in the modulation of $\lambda$, (i.e., the amplitude of the teacher forcing). Even though in both cases the error functional was reduced to a negligible level, the effect of the teacher forcing in case 5 was not completely eliminated over the entire length of the trajectory. This points toward the fact that modulation of $\lambda$ not only reduces the number of iterations but also provides higher quality results.

While the invention has been described detail by specific reference to preferred embodiments, it is understood that variations and modifications thereof may be made without departing from the true spirit and scope of the invention.

What is claimed is:

1. A method of training a neural network so that a neuron output state vector thereof obeys a set of forward sensitivity equations over a finite learning period, said method comprising:

defining first and auxiliary adjoint systems of equations governing an adjoint function and an auxiliary adjoint function, respectively, of said neural network;

setting said adjoint function to zero at the beginning of said learning period and integrating said adjoint system of equations forward in time over said learning period to produce a first term of an indirect effect of a sensitivity gradient of said neural network;

setting said auxiliary adjoint function to zero at the end of said learning period and integrating said auxiliary adjoint system of equations forward in time over said learning period to produce a remaining term of said indirect effect;

computing a sum of said first and remaining terms, and multiplying said sum by a learning rate; and subtracting the product thereof from a current neuron parameter vector to produce an updated neuron parameter vector.

2. The method of claim 1 wherein said adjoint system of equations governs an adjoint function of said network relative to a time dependent adjoint matrix of said network and a source function of said network over said learning period, and wherein said integrating said adjoint system of equations produces an integral over said learning period of the adjoint function's transpose multiplied by a derivative of said source function with respect to neuron parameters of said network.

3. The method of claim 2 wherein said integrating said auxiliary adjoint system of equations comprises:

computing a propagation kernel for each time step of said learning period from the product of said adjoint matrix of the current time step and an integrating time step size;

multiplying each kernel by the source function evaluated at the current time step and accumulating a sum of products therefrom; and multiplying the sum of products by a function of (a) the product of all kernels of previous time steps and (b) the adjoint function evaluated at a final time step to produce a final product.

4. The method of claim 3 where said computing said multiplying to produce an updated neuron parameter matrix comprises computing a sum of said final product and said integral, multiplying said sum by a learning rate and subtracting the result thereof from a current neuron parameter vector to produce an updated neuron parameter vector.

5. The method of claim 1 said neural network comprises an output layer of output neurons coupled to other neurons of said network, said method further comprising:

setting outputs of said output neurons to values derived from a desired output training vector to perform teacher forcing.

6. A method of training a neural network in accordance with an adjoint system of equations governing an adjoint function of said network relative to a time dependent adjoint matrix of said network and a source function of said network over a finite learning period, said method comprising:

integrating said adjoint system of equations forward in time over said learning period to produce said adjoint function evaluated at the end of said learning period and to produce an integral over said learning period of the adjoint function's transpose multiplied by a derivative of said source function with respect to neuron parameters of said network;

computing a propagation kernel for each time step of said learning period from the product of said adjoint matrix of the current time step and an integration time step size;

multiplying each kernel by the source function evaluated at the current time step and accumulating a sum of products therefrom;

multiplying the sum of products by a function of (a) the product of all kernels of previous time steps and (b) the adjoint function evaluated at a final time step to produce a final product;

computing a sum of said final product and said integral, and multiplying said sum by a learning rate; and subtracting the result thereof from a current neuron parameter vector to produce an updated neuron parameter vector.

7. The method of claim 6 said neural network comprises an output layer of output neurons coupled to other neurons of said network, said method further comprising:

setting outputs of said output neurons to values derived from a desired output training vector at the beginning of said learning period to perform teacher forcing.

8. Apparatus for training a neural network so that a neuron output state vector thereof obeys a set of forward sensitivity equations over a finite learning period, said apparatus comprising:

means for setting said neuron output state vector to zero at the beginning of said learning period;

means for defining first and auxiliary adjoint systems of equations governing an adjoint function and an auxiliary adjoint function, respectively, of said neural network;

means for setting said adjoint function to zero at the beginning of said learning period and integrating said adjoint system of equations forward in time over said learning period to produce a first term of an indirect effect of a sensitivity gradient of said neural network;

means for setting said auxiliary adjoint function to zero at the end of said learning period and integrating said auxiliary adjoint system of equations forward in time over said learning period to produce a remaining term of said indirect effect;

means for computing a sum of said first and remaining terms, and multiplying said sum by a learning rate; and subtracting the product thereof from a current neuron parameter vector to produce an updated neuron parameter vector.

9. The apparatus of claim 8 wherein said adjoint system of equations governs an adjoint function of said network relative to a time dependent adjoint matrix of said network and a source function of said network over said learning period, and wherein said means for integrating said adjoint system of equations produces an integral over said learning period of the adjoint function's transpose multiplied by a derivative of said source function with respect to neuron parameters of said network.

10. The apparatus of claim 9 wherein said means for integrating said auxiliary adjoint system of equations comprises:

means for computing a propagation kernel for each time step of said learning period from the product of said adjoint matrix of the current time step and an integration time step size;

means for multiplying each kernel by the source function evaluated at the current time step and accumulating a sum of products therefrom; and means for multiplying the sum of products by a function of (a) the product of all kernels of previous time steps and (b) the adjoint function evaluated at a final time step to produce a final product.

11. The apparatus of claim 10 wherein said means for computing and multiplying to produce an updated neuron parameter matrix comprises means for computing a sum of said final product and said integral, means for multiplying said sum by a learning rate and means for subtracting the result thereof from a current neuron parameter vector to produce an updated neuron parameter vector.

12. Apparatus for training a neural network in accordance with an adjoint system of equations governing an adjoint function of said network, a time dependent adjoint matrix of said network and a source function of said network over a finite learning period, said apparatus comprising:

means for integrating said adjoint system of equations forward in time over said learning period to produce said adjoint function evaluated at the end of said learning period and to produce an integral over said learning period of the adjoint function's transpose multiplied by a derivative of said source function with respect to neuron parameters of said network;

means for computing a propagation kernel for each time step of said learning period from the product of said adjoint matrix of the current time step and an integration time step size;

means for multiplying each kernel by the source function evaluated at the current time step and accumulating a sum of products therefrom;

means for multiplying the sum of products by a function of (a) the product of all kernels of previous time steps and (b) the adjoint function evaluated at a final time step to produce a final product;

means for computing a sum of said final product and said integral, and multiplying said sum by a learning rate; and subtracting the result thereof from a current neuron parameter vector to produce an updated neuron parameter vector.

13. A method of training a neural network in successive learning periods to respond to an input vector which is variable in time rapidly relative to said successive learning periods, in which a neuron parameter vector of said network is modified at the end of each learning period by combining it with an indirect effect function comprising a gradient of an error functional with respect to said neuron parameter vector, said error functional comprising a difference between a neuron output state vector and a target output state vector which is variable in time rapidly relative to said successive training periods, said network being characterized by a matrix of coupling coefficients defining coupling between respective neurons of said network, said method comprising the following steps carried out during each one of said learning periods:

defining first and second equations governing, respectively, first and second variables, terms of each of said equations comprising a product of the respective variable and a coupling term comprising said matrix of coupling coefficients, a derivative of the respective variable with respect to time and a source term which, in said first equation, comprises a gradient of said error functional with respect to said neuron output state vector;

setting said first and second variables to zero at the beginning and end, respectively, of said learning period;

integrating said first equation forward in time from the beginning to the end of said one learning period to produce a first term of said indirect effect function and integrating said second equation forward in time from the beginning to the end of said one learning period to produce a second term of said indirect effect function; and computing a sum of said first and second terms, and multiplying said sum by a learning rate; and combining the product thereof with a current version of said neuron parameter vector to produce a revised version of said neuron parameter vector at the end of said one learning period.

14. The method of claim 13 wherein said combining step comprises subtracting said product from said current version of said neuron parameter vector.

15. The method of claim 13 wherein in said second equation said source term is equal to said variable of said first equation at the end of said learning period.

16. The method of claim 13 wherein the step of integrating said second equation forward in time comprises:

dividing said learning period into plural time steps and at each time step:
(A) computing a propagation kernel of the current time step from a product of said coupling term of the current time step and a time interval of said plural time steps;
(B) multiplying the kernel of the current time step by the source term of said second equation of the current time step and accumulating a sum of products therefrom; and
(C) multiplying said sum of products by a function of (a) the products of the kernels of the preceding time steps and (b) the variable of said first equation.

17. The method of claim 16 wherein in step (C) (b), said variable of said first equation has been evaluated at the final one of said time steps.

18. A method of training a neural network in successive learning periods to respond to an input vector which is variable in time rapidly relative to said successive learning periods, in which a neuron parameter vector of said network is modified at the end of each learning period by combining it with an indirect effect function comprising a gradient of an error functional with respect to said neuron parameter vector, said error functional comprising a difference between a neuron output state vector and a target output state vector which is variable i time rapidly relative to said successive training periods, said network being characterized by a matrix of coupling coefficients defining coupling between respective neurons of said network, said method comprising the following steps carried out during each one of said learning periods:

defining an equation governing a variable, terms of said of said equation comprising a product of the variable and a coupling term comprising said matrix of coupling coefficients, a derivative of the variable with respect to time and a source term which comprises a gradient of said error functional with respect to said neuron output state vector;

setting said first variable to zero at the beginning of said learning period;

integrating said equation forward in time from the beginning to the end of said one learning period to produce a first term of said indirect effect function;

dividing said learning period into plural time steps and at each time step:
(A) computing a propagation kernel of the current time step from a product of said coupling term of the current time step and a time interval of said plural time steps;
(B) multiplying the kernel of the current time step by an other source term of the current time step and accumulating a sum of products therefrom;
(C) multiplying said sum of products by a function of (a) the products of the kernels of the preceding time steps and (b) said variable; and computing a sum of said first and second terms, and multiplying said sum by a learning rate; and combining the product thereof with a current version of said neuron parameter vector to produce a revised version of said neuron parameter vector at the end of said one learning period.

19. The method of claim 18 wherein the step (C) (b), said variable has been evaluated at the final one of said time steps.

20. The method of claim 18 wherein said combining step comprises substracting said product from said current version of said neuron parameter vector.

* * * * *